United States Patent Office 3,088,595
Patented May 7, 1963

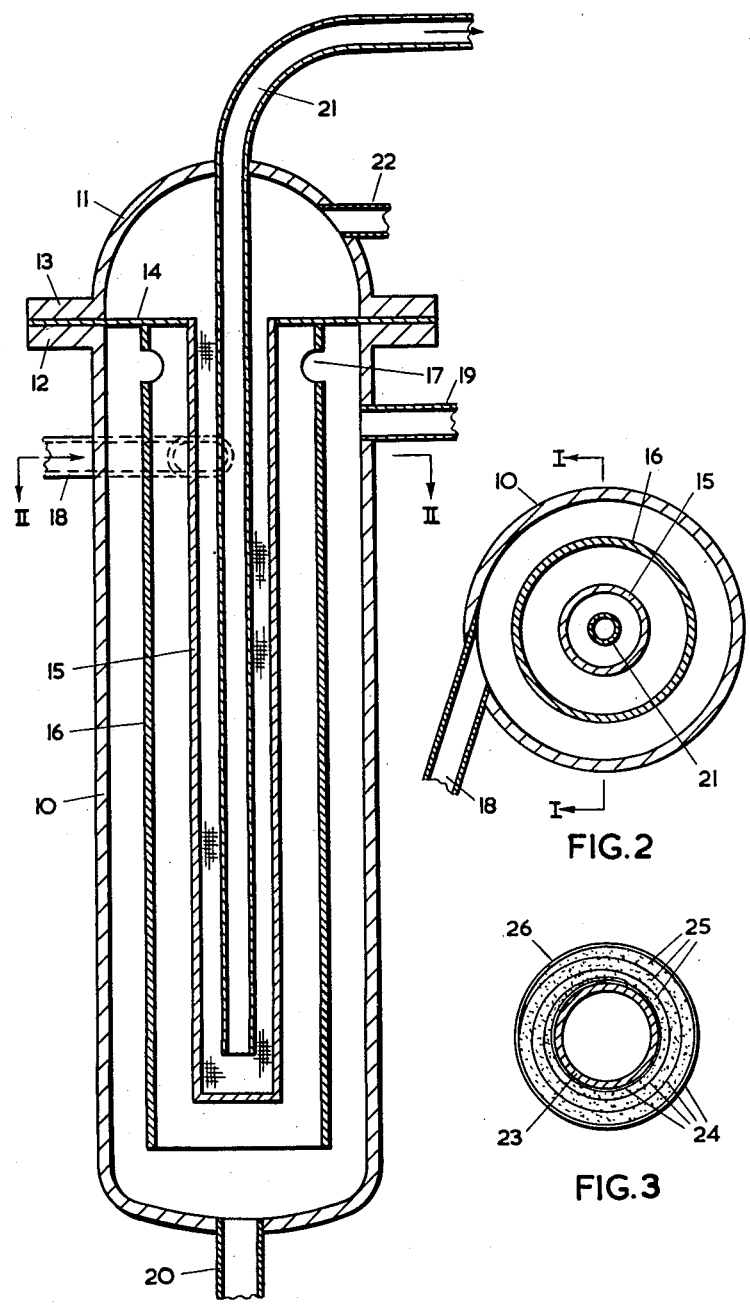

3,088,595
FILTER UNIT
James Robb, Carshalton, England, assignor to The British Oxygen Company Limited, a British company
Filed Sept. 29, 1960, Ser. No. 59,213
Claims priority, application Great Britain Oct. 7, 1959
2 Claims. (Cl. 210—304)

The invention relates to a filter unit for separating solid carbon dioxide from a mixture of gaseous and liquid air containing solid carbon dioxide in suspension, such as is obtained in certain low temperature air separation processes.

In the low temperature separation of air, it is necessary at some stage to remove carbon dioxide from the feed air in order to avoid blockages caused by deposition of solid carbon dioxide when the air is cooled below the solidification point of carbon dioxide. One commonly used method is chemical absorption of the carbon dioxide by liquid or solid alkalis. This method, however, requires a supply of chemicals and is therefore disadvantageous, particularly for small and mobile plants.

In many air separation plants, the carbon dioxide is removed physically, the bulk of the carbon dioxide being removed from the air by passage through regenerators or reversing exchangers. Residual carbon dioxide in the air leaving the regenerators or reversing exchangers must, however, still be removed. This is normally effected after expansion of the high pressure air to produce a three-phase system consisting of a mixture of gaseous and liquid air containing solid carbon dioxide in suspension, either by direct filtration of the three-phase system or by first separating a liquid phase containing solidified carbon dioxide and a vapour phase in a scrubber vessel, followed by removal of the carbon dioxide by filtration from the liquid phase. Direct filtration of the three-phase system leads to large pressure drops caused by blockage of the filter; this appears to be caused by the relatively high velocity of the gas/liquid stream after expansion of the high pressure air, which causes the carbon dioxide particles to penetrate into the filter plate with such great momentum that their subsequent removal is very difficult. Filtration of the liquid only after separation avoids this trouble, but it requires two vessels and, moreover, requires liquid level control on the separation vessel.

It is an object of the present invention to provide a filter unit which does not suffer from these disadvantages.

According to the present invention, a filter unit for separating solid carbon dioxide from a mixture of gaseous and liquid air containing solid carbon dioxide in suspension comprises a cylindrical vessel, a filter candle suspended within the vessel, a fluid inlet opening tangentially into the vessel, a fluid outlet opening within the filter candle and a sleeve surrounding and spaced from the filter candle, the sleeve being open at its lower end to permit access of liquid to the filter candle and having one or more ports at its upper end to permit access of vapour to the candle.

The term "filter candle" as used herein is intended to mean a filter element in the form of an axially-extending hollow body closed at its lower end and having an opening at its upper end from the periphery of which the body is adapted to be suspended within the filter vessel in such manner that the fluid to be filtered is arranged to pass through the wall of the body from the outside to the inside. Normally, the filter candle will be in the form of a hollow cylinder closed at its lower and open at its upper end.

One form of filter unit according to the invention will now be described in more detail with reference to the accompanying drawings in which FIGURE 1 is a diagrammatic side sectional view of the filter unit;
FIGURE 2 is a section along the line II—II of FIGURE 1; and
FIGURE 3 is a cross-sectional view of a preferred form of filter candle for use in the filter unit of FIGURE 1, taken normal to the axis of the candle.

Referring to FIGURE 1, the filter unit comprises a filter vessel consisting of a lower body portion 10 closed by an upper cap portion 11. These portions are provided with peripheral flanges, 12 and 13 respectively, between which is clamped an annular metal plate 14 from the inner periphery of which depends a cylindrical filter candle 15, open at the top and closed at the bottom. Also dependent from the plate 14 is a sleeve 16, surrounding and spaced from the candle 15 and open at its lower end. The upper end of the sleeve 16 adjacent the plate 14 is provided with a plurality of holes 17 spaced around the sleeve.

The body portion 10 is provided with a tangential fluid inlet 18, as shown more clearly in FIGURE 2, with a vent 19 leading to a safety-valve (not shown) and with a drain 20 at its lowest point, controlled by a valve (not shown).

A fluid outlet in the form of a dip pipe 21 extends through the cap portion 11 into the interior of the candle 15 and opens adjacent the bottom thereof. The cap portion is also provided with a vent 22 connected to a safety valve (not shown).

A preferred construction of the candle 15 is shown in FIGURE 3. In this construction, a hollow porous metal cylinder 23 closed at one end, which may be made, for example, of sintered bronze, or perforated metal plate, or of woven or knitted metal gauze, has wound upon it from 2 to 6 layers 24 of glass twill, the individual layers being separated by layers of glass staple fibre 25. The whole assembly is held in position by an outer cover of metal gauze 26.

In operation, the high pressure air stream consisting of a mixture of liquid and gas with solid carbon dioxide in suspension therein enters the filter vessel through the fluid inlet 18, direct impingement of the air stream on the filter candle 15 being prevented by the sleeve 16. Owing to the tangential placing of the inlet, the entering air stream swirls around the vessel and owing to the resulting cyclonic action, the liquid portion is swept against the walls of the vessel and drains down then to collect at the bottom. This liquid rises within the sleeve 16 and is filtered through the bottom of the candle 15. The separated gaseous air passes through the ports 17 in the sleeve 16 and is filtered through the upper part of the candle. The filtered gas and liquid are withdrawn from the interior of the candle through the dip pipe 21.

With this arrangement, there is no need to make provision for liquid level control since the level of liquid will depend upon the maintenance of equal pressure drops through the areas of the candle 15 occupied by the gas and liquid streams respectively. Thus, initially, the liquid will take up a level such that the pressure drops for the gas and liquid paths through the filter candle 15 for the flow rates used are equal. As the filter cake builds up at the bottom of the candle, the liquid level will rise since, to maintain equal pressure drops, a larger area of candle is required for liquid filtration.

If the pressure drop across the filter becomes too high, the filter cake and some of the liquid can be removed through the drain 20.

The filter candle may be cleaned periodically by blowing a suitable purge gas in through the vent 22 so that it is forced under pressure from the inside to the outside of the candle.

I claim:

1. A filter unit for separating solid carbon dioxide from a mixture of gaseous and liquid air containing solid carbon dioxide in suspension comprising an elongate cylindrical axially vertically disposed vessel, a cylindrical porous filter candle coaxially disposed within said vessel and including a closed bottom portion spaced from the bottom of said vessel, said candle adapted to permit the passage of gas and liquid but to prevent the passage of solids suspended within said vessel, an impervious cylindrical sleeve member coaxially disposed within said vessel and around said candle, said sleeve extending within said vessel to a point above the bottom thereof but below the closed end of the filter candle, said sleeve including passage means in the upper end thereof, said passage communicating the exterior of said sleeve with said filter candle, a fluid inlet opening tangentially into said vessel exteriorly of said sleeve, and fluid outlet means within said filter candle in the form of an impervious dip pipe parallel to and spaced from the inner wall of said candle and terminating with an open end adjacent the bottom of said candle, said sleeve being open at its lower end below the bottom of the filter candle to permit access of liquid to said filter candle, said gaseous portion of said mixture communicating with said filter candle through said passage means in said sleeve, whereby said gaseous portion of said mixture communicates with said open end of said dip pipe within said filter.

2. A filter unit according to claim 1 wherein said filter candle comprises a hollow porous metal cylinder on which is continuously wound from 2 to 6 layers of glass twill, the individual layers being separated by a thickness of glass staple fiber, and an outer cover of metal gauze.

References Cited in the file of this patent

UNITED STATES PATENTS

| | | |
|---|---|---|
| 1,202,356 | Blackmer | Oct. 24, 1916 |
| 1,471,807 | Roosevelt | Oct. 23, 1923 |
| 2,511,967 | Campbell | June 20, 1950 |
| 2,911,101 | Robinson | Nov. 3, 1959 |
| 3,020,950 | Schraivogel | Feb. 13, 1962 |